July 11, 1967  E. LOEB  3,330,733

CORE ELEMENT GUIDES AND LOCKS FOR HORIZONTAL REACTOR

Filed Sept. 17, 1965  3 Sheets-Sheet 1

Inventor
Ernest Loeb
By Forest C. Sexton
Attorney

Inventor
Ernest Loeb
By Forest C. Sexton
Attorney

United States Patent Office 3,330,733
Patented July 11, 1967

3,330,733
CORE ELEMENT GUIDES AND LOCKS FOR HORIZONTAL REACTOR
Ernest Loeb, Silver Spring, Md., assignor to Allis-Chalmers Manufacturing Company, Milwaukee, Wis.
Filed Sept. 17, 1965, Ser. No. 488,187
8 Claims. (Cl. 176—33)

This invention relates generally to control rod guide sleeves for nuclear reactors. More specifically, this invention relates to apparatus for easily positioning and securing control rod guide sleeves in nuclear reactors, and particularly horizontally disposed nuclear reactors, of the type described in U.S. Patent 3,208,914 issued Sept. 28, 1965 to J. J. Dickson.

The above cited patent (U.S. 3,208,914) discloses and describes a horizontally disposed nuclear reactor wherein the fuel elements and control rods are stacked in a horizontal position within the core side and end plate structure to comprise the reactor core. The stacking is effected through an opening on the top side of the reactor, with the core elements being placed perpendicularly between two parallel relatively spaced core end plates. After being positioned, the core elements are held in place at the ends by the core end plates, on the sides and bottom by the core side plates, and held down from above by a closure plug in the top opening. By this arrangement, the reactor particularly lends itself for use as a power source in mobile units such as marine vessels since it eliminates the need for excessive headroom, provides a low profile and has a lower center of gravity.

Control rods in the subject reactor are provided by stacking hollow guide sleeves among the stacked fuel elements at certain preselected positions, mating the openings therethrough with like openings in the core end plates. The control rods are then easily guided through the openings in the core end plate and through the guide sleeves. Thus, the control rods, being reciprocable endwise parallel to the horizontal fuel elements, contribute to the elimination of excessive headroom.

The above described control rod guide mechanism does however present one major disadvantage in that it is not easy where remote assembly and disassembly operations are required (due to radioactivity) to get the openings in the guide sleeves to match perfectly with the openings in the core end plates. Therefore, difficulties may be experienced in attempting to guide the control rods into the core; or when positioned in the core, misalignment may cause the control rods to bind so that they cannot be easily moved in and out as is necessary to control the reactor. Of course, if sufficient clearance is provided between the control rod and control rod guide sleeve, perfect alignment will not be necessary. This however, requires a reduction in the size of the control rod, which is not particularly desirable.

This invention is predicated upon the discovery and development of a control rod guide sleeve positioning and locking means which assures ease of assembly and disassembly and a perfect alignment of the guide sleeve to the openings in the core end plate to facilitate movement of the control rods, and therefore permits the use of larger, more efficient control rods.

Accordingly, it is a primary object of this invention to provide a control rod guide sleeve positioning and locking means for a horizontally disposed nuclear reactor of the type described in U.S. 3,208,914 which assures perfect alignment of the control rod guide openings to prevent the control rods from binding and jamming.

It is another primary object of this invention to provide control rod guide sleeve positioning and locking means for a horizontal reactor which permits ease of assembly of the core elements by remote means.

It is still another primary object of this invention to provide a control rod guide sleeve positioning and locking means for a horizontal reactor which permits the use of larger control rods.

This and other objects and advantages are fulfilled by this invention as will become apparent from the following detailed description especially when considered in conjunction with the attached drawings of which:

Figure 1:
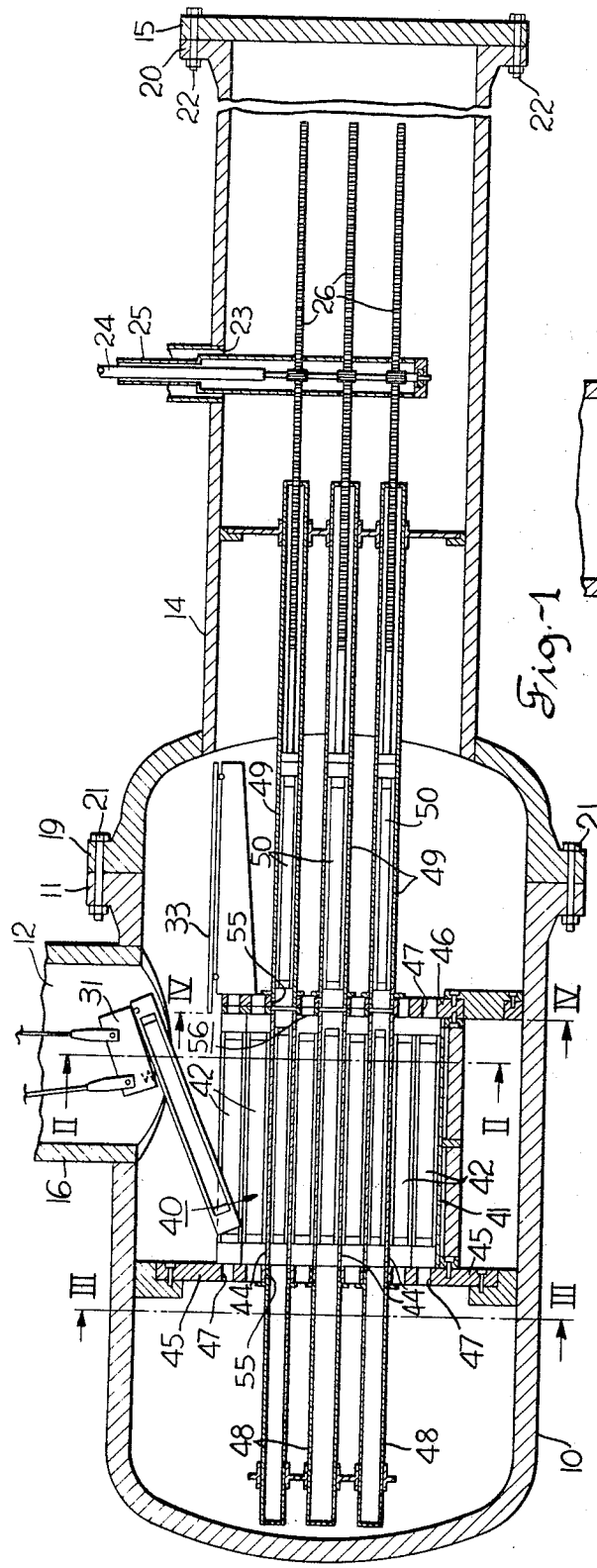
FIG. 1 is an elevational side view of the reactor shown in section; as shown, the core is being refueled through the access opening.
Figure 2:
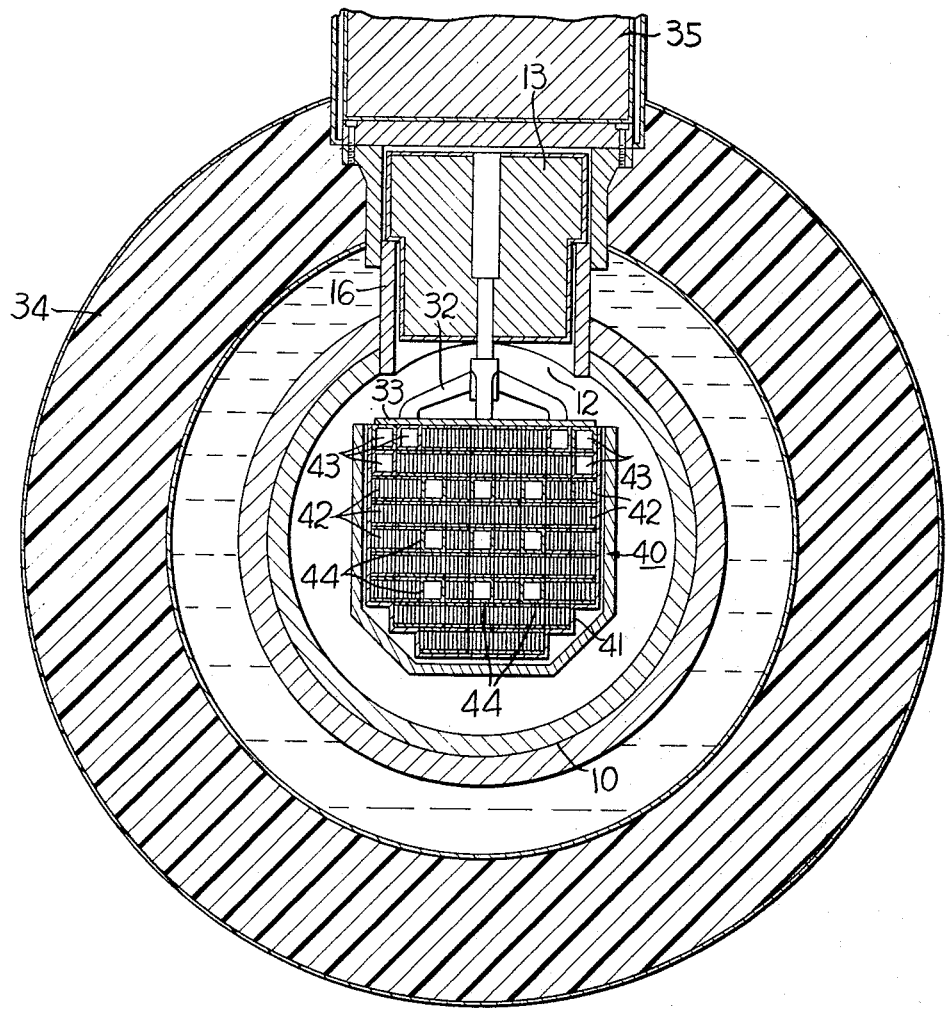
FIG. 2 is a sectional end view taken along line II—II of FIG. 1 with the core being fully loaded and all closures in place.

Referring to the drawings and particularly to FIGS. 1 and 2, one embodiment of the reactor to which this invention relates comprises a horizontally disposed reactor pressure vessel 10 being open at one end and closed at the other, and having an outwardly extending flange 11 around its open end. The reactor has an access opening 12 in the upper longitudinally extending side wall of vessel 10, which serves as a refueling port, a refueling port cover 13 (FIG. 2), and end head 14, an end head cover 15 and coolant inlet and outlet ports (not shown).

The end head 14 comprises a longitudinally extending tubular housing having outwardly extending flanges 19 and 20 at its ends, respectively and forms a coaxial extension to vessel 10. Housing flange 19 abuts the vessel flange 11 and is attached thereto by any means such as bolts 21. The cover 15 is attached to the other housing flange 20 by any means such as bolts 22.

The tubular housing of end head 14 has a plurality of bores 23 defined therethrough transverse to the axis thereof for passage of the control rod drive shafts 24 (only one of these bores and shafts being shown). Upward extending adapters 25 are disposed concentrically within the bores 23 and provide means for connecting the control rod drives or racks 26.

As shown in FIG. 2, the refueling port 12 includes an upward extension 16 of the pressure vessel 10 fitted with a suitable closure or shield plug 13. A spring loaded holddown tripod 32 depends from shield plug 13 and may be disposed in thrust transmitting relationship against the holddown plate 33 to clamp the core elements against the shroud bottom to maintain the core elements rigid during reactor operation. To load and unload the core, shield plug 13 is removed, the holddown plate 33 is rolled back (as shown in FIG. 1) and thus the fuel assemblies and guide sleeves can be removed or replaced using a suitable grappling tool 31.

Radiation shielding 34 may surround vessel 10 and includes a removable outer plug 35, as shown in FIG. 2.

Nuclear core 40 is centrally disposed within vessel 10 and comprises a shroud structure 41 having a compact stacked arrangement of core elements therein. These core elements include the fuel element assemblies 42, dummy assemblies 43 and the control rod guide sleeves 44. The fuel assemblies 42 are stacked in a hexagonal array, while the dummy assemblies 43 are used to fill in the space outside the hexagonal fueled region.

Figure 4:
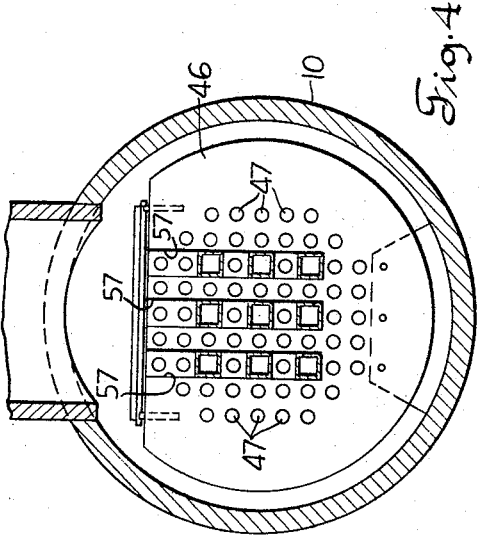
FIG. 4 is a sectional view along line IV—IV of FIG. 1 showing the side face view of the rear core end plate.
Figure 3:
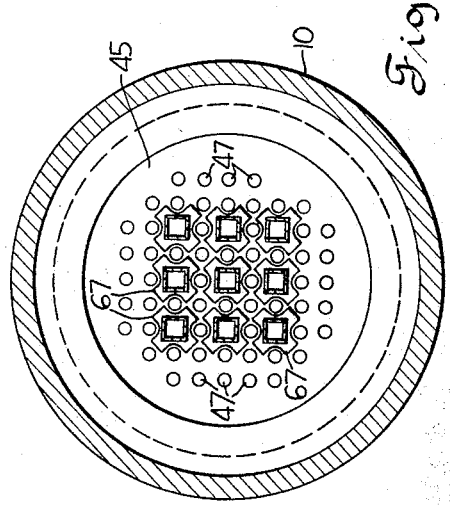
FIG. 3 is a sectional end view taken along line III—III of FIG. 1 showing the outside face view of the front core end plate.

The shroud 41 is supported at each end by the front and rear core end plates 45 and 46 respectively. The end plates 45 and 46, shown in detail in FIGS. 3 and 4 respectively, have coolant flow openings 47 defined therethrough adjacent to each fuel assembly position. Guide sleeve extensions 48 and 49 extend from rectangular openings 55 in end plates 45 ad 46 respectively to receive the reciprocating control rod assembly 50. Shroud 41 is open at the top to allow the core elements to be removed and replaced through refueling port 12. The spring loaded holddown plate 33 is provided to close the top of shroud 41 and prevent movement of the core elements during reactor operation.

As shown in FIG. 2 a cross section of the loaded core 40 comprises movable and stationary core elements arranged to define an irregular hexagon. The stationary core elements comprise the fuel assemblies 42, dummy assemblies 43 and the control rod guide sleeves 44. The movable core elements comprise the control rod assemblies 50 which reciprocate through guide sleeves 44 and guide sleeve extensions 48 and 49. The stationary core elements are arranged transverse to the end plates 45 and 46 and are stacked inside the shroud 41 so that each stacked element rests directly upon the element below. The dummy assemblies 43 are placed to present a uniform top surface, so that the pressure exerted upon the core elements by the holddown plate 33 not only secures the elements against upward movement, but also causes the elements to bear upon each other to maintain the core rigid.

To provide adequate circulation of coolant through the core, the fuel assemblies 42 are open at the ends, the guide sleeve extensions 48 and 49 are provided with apertures (not shown) at the ends thereof, and each control rod assembly may have apertures at the ends of each section. In addition, slots (not shown) may be provided on the sides of the fuel assemblies 42, guide sleeves 44 and control rod 50.

The crux of this invention resides in the control rod guide sleeves 44 and the method by which they are secured to the core end plates to provide perfect alignment of the openings therethrough to the openings in the guide sleeve extensions 48 and 49. The control rod guide sleeves 44 (FIG. 5) are removable in the same way as the fuel assemblies 42 and dump assemblies 43 (as by a suitable grappling tool 31 as shown in FIG. 1), and have substantially the same circumferential dimensions. The guide sleeves 44 are however, slightly longer than the fuel and dummy assemblies 42 and 43, and thus are greater in length than the distance between the two end plates. Since the guide sleeves 44 are greater in length than the distance between the two core end plates 45 and 46, suitable slots 57 (FIGS. 4 and 5), having the same width as the guide sleeves 44, are provided on the inside face of the rear core end plate 46, to allow horizontal placement of the guide sleeves 44 between the vertical core end plates.

Figure 5:
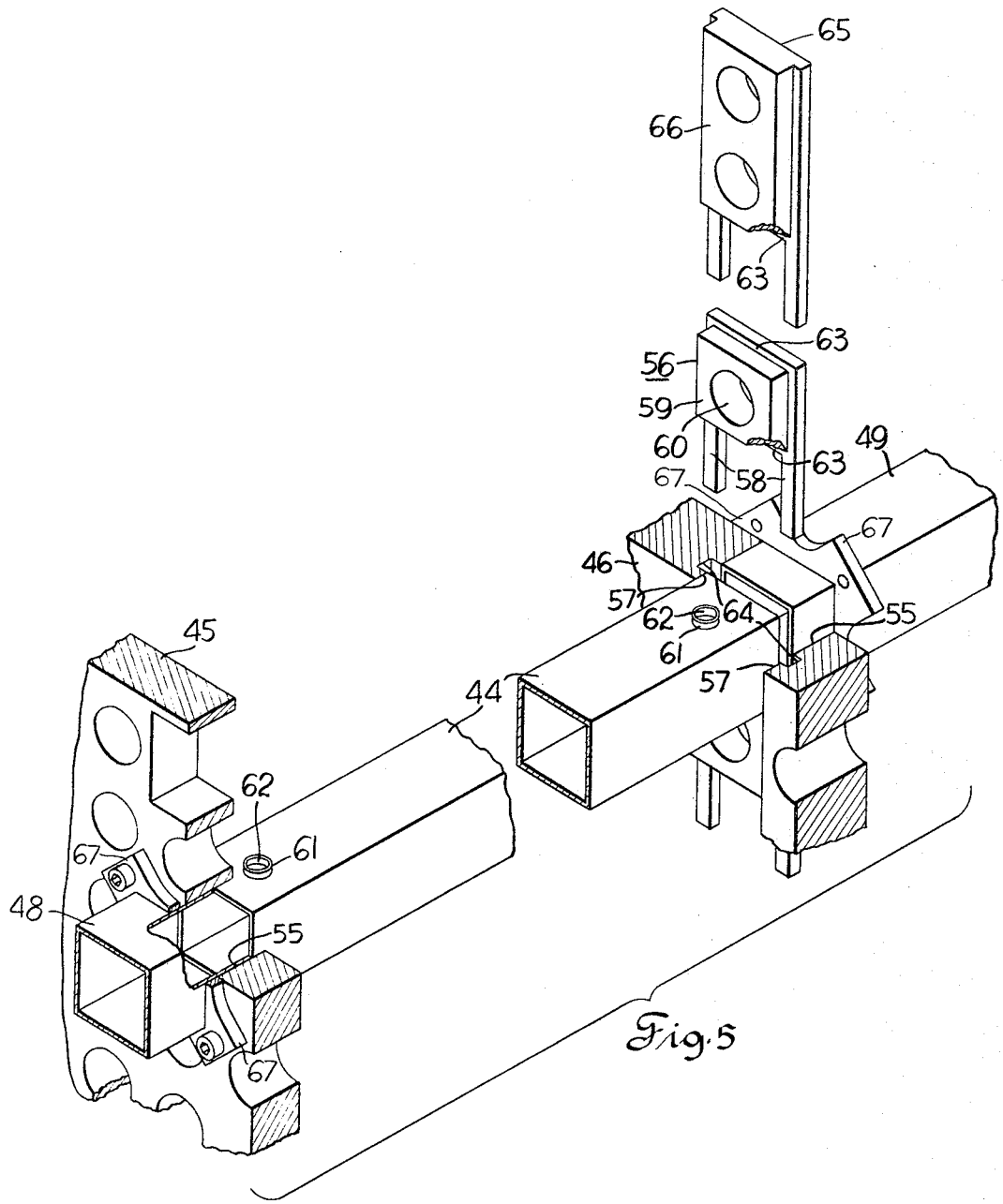
FIG. 5 is an isometric perspective view of the control rod guide sleeve assembly in position between the core end plates.

Referring to FIG. 5, alignment of the guide sleeves 44 with the respective guide sleeve extensions 48 and 49 is achieved by partially inserting the forward edge of sleeve 44 into the rectangular opening 55, abutting extension 48. The rearward edge of guide sleeve 44 will remain partially inserted in slot 57, but will not abut the rear guide sleeve extension 49, being spaced therefrom by a distance equal to the depth at which the forward end of sleeve 44 is inserted into opening 55 in the front end plate 45. A pair of keyways 64 are provided along the inside surface of slots 57 having a width equal to the distance between the edges of guide sleeve 44 and guide sleeve extension 49. Therefore, when the guide sleeve 44 has been pushed forward into the opening 55 in front end plate 45 to abut the guide sleeve extension 48, a keyed spacer 56 may be inserted in the rear end plate 46 to lock the guide sleeve 44 in place.

Each keyed spacer 56 (FIG. 5) is provided with legs 58 that are received by the keyways 64 in the rear core end plate 46 and a square boxlike portion 59 having a flow opening 60 therethrough which is received by slots 57. The length of the legs 58, measured from their distal ends to the body 59, is equal to the height of the guide sleeve 44, and the body portion 59 is of the same height and width as the fuel assembly which will be placed adjacent thereto immediately above the guide sleeve, which is in turn the same as that of the guide sleeve 44. The axial thickness of the boxlike portion 59 is greater than the axial width of the keyways 64 and is such as will fill the slot 57 between guide sleeves 44 to provide end plate 46 with an even inside surface. Flange portions 63 may be provided above and below the boxlike portion 59 having a height equal to the thickness of the upper and lower wall portions of the guide sleeve 44. The flow opening 60 in the keyed spacer 56 will mate with a flow opening 47 in rear end plate 46.

When the keyed spacer 56 is in position, legs 58 and flange portions 63 will be disposed between and abut the edges of guide sleeve 44 and guide sleeve extension 49. The inside surface of legs 58 and flanges 63 should be flush with the inside surfaces of sleeve 44 and extension 49, so as not to obstruct passage of control rod 50 therethrough.

The guide sleeves 44 are disposed between the front and rear end plates 45 and 46 by lowering each sleeve 44 into its respective location in the shroud 41 during the normal sequential loading operation, and pushed forward until seated in its front end plate socket 55. Loading of the longer guide sleeves 44 is facilitated by slots 57. A keyed spacer 56 is then inserted in a rear end plate slot 57 and keyway 64 to hold the front end of guide sleeve 44 in position within socket 55, and hold the rear end of the guide sleeve 44 against the opening in the rear end plate 46. The spacer legs 58 abut the end of the guide sleeve 44 to prevent axial displacement thereof. The square boxlike portion 59 of spacer 56 rests on the guide sleeve 44 to accurately space the guide sleeve 44 directly above and provide a flush interior surface on the rear end plate 46 directly above the guide sleeve 44. The rearward end of the next guide sleeve 44 will rest upon the top of the boxlike portion 59 and so on.

Since two fuel assemblies 42 are placed above each uppermost guide sleeve 44, the last or uppermost keyed spacer 65 is slightly different from the other keyed spacers 56. The total height of the box portion 66 must be sufficient to fill in the slot 57 and keyway 64 as necessary (FIG. 5).

The guide sleeves 44 may be registered with the fuel assemblies 42 immediately above and below by providing outward extending pins 61 having bores 62 coaxially therewith in the end portions of the upper and lower surfaces thereof. The pins 61 are received by holes (not shown) in the fuel assemblies 42 disposed below and above the guide sleeves 44.

The guide sleeve extensions 48, 49 have flanges 67 associated therewith and are removably attached to the axially outward side of the end plates 45 and 46 respectively, and extend parallel to the core axis. Because of the relative inaccessibility of the guide sleeve extensions 48 and 49 each guide sleeve extension may be provided with Stellite faced surfaces to reduce wear. Thus, the wear is largely confined to the removable portions of the control elements which are readily removed and replaced during normal refueling operations.

The core is controlled in conventional fashion by control rod assemblies 50 (as shown, nine in a three times three array) around the core center line. The reactor power is adjusted by endwise movement of the rods 50 between a scram position and an operating position. The depletion of the burnable boron, if utilized, also adjusts the amount of available fission material. The control rods 50 are of a square cross-sectional configuration and are dimensioned to fit the opening within the guide tube 44.

Preferably, the control rod assemblies 50 are loaded into the reactor core in much the same manner as the fuel assemblies 42 are loaded. In the normal sequential loading operation however, the control rod assemblies 50 must be secured to the control rod drives or racks 26 which are insertable through the rectangular openings 55 in end plate 46. Then the control rod assembly 50 can be pulled back into rear guide sleeve extension 49 while the guide sleeve 44 is inserted and locked adjacent thereto. Subsequently, the control rod assembly can be reinserted into the core by reciprocal motion back through the guide sleeve 44. Each control rod 50 may comprise one or more detachably interconnected sections; such as a poison section and a fuel section.

It should be obvious that the relative order of the guide sleeve positioning and locking means as described above could be completely reversed. That is, the keyways 64 could be on the front end plate with the sockets 55 on the rear end plate and so on, with the same advantages being realized. Further, the specific design of the keyed spacers 56 and keyways 65 could be modified substantially without departing from the spirit of this invention.

It should also be obvious that the principles of this invention could easily be applied to vertically disposed nuclear reactors, with the realization of substantial advantages. That is, the typical vertical reactor is usually provided with excessive equipment and components on top of the core which must be removed in order to have access to the core. For example, boiling water reactors may have steam separators, dryers, monitoring equipment, holddown devices etc. which would complicate loading and unloading the core. Thus, to avoid being hindered by such equipment, it may be desirable in vertical reactors to provide a side access to the core in much the same way as provided in the horizontal reactor described herein. In such a side access, vertical reactors, control rod guide sleeves and locking means as described herein could be utilized. Accordingly, this invention is not to be limited to the details given herein, but may be modified within the scope of the appending claims.

The embodiments of the invention in which an exclusive property or privilege is claimed are defined as follows:

1. In a nuclear reactor of the type having a core structure comprising a plurality of elongated fuel assemblies and a plurality of elongated control rod guide sleeves placed within said core through an access opening in the longitudinal side of the reactor vessel, means for releasably securing said fuel assemblies and guide sleeves within said core, drive means for reciprocating a plurality of elongated control rod assemblies through said control rod guide sleeves in a parallel relation to said fuel assemblies; the improvement comprising in combination, said control rod guide sleeves being greater in length than said fuel assemblies, a pair of parallel relatively spaced core end plates abutting the ends of the fuel elements, said core end plates having openings therethrough adjacent to said control rod guide sleeves to receive the ends of said control rod guide sleeves and provide withdrawal of the control rod assemblies from the core structure, and means for locking said control rod guide sleeves into the openings in said core end plates.

2. In a nuclear reactor of the type having a core structure comprising a plurality of elongated fuel assemblies and a plurality of elongated control rod guide sleeves stacked in a horizontal position through an access opening in the top of the reactor vessel, means for releasably securing said fuel assemblies and guide sleeves horizontally within said core, drive means for reciprocating a plurality of elongated control rod assemblies horizontally through said control rod guide sleeves in a parallel relation to said fuel assemblies; the improvement comprising in combination, said control rod guide sleeves being greater in length than said fuel assemblies, a pair of parallel relatively spaced core end plates abutting the ends of the fuel elements, said core end plates having openings therethrough adjacent to said control rod guide sleeves to receive the ends of said control rod guide sleeves and provide withdrawal of the control rod assemblies from the core structure, and means for locking said control rod guide sleeves into the openings in said core end plates.

3. In a nuclear reactor of the type having a core structure comprising a plurality of elongated fuel assemblies and a plurality of elongated control rod guide sleeves stacked in a horizontal position through an access opening in the top of the reactor vessel, means for releasably securing said fuel assemblies and guide sleeves horizontally within said core, external drive means for reciprocating a plurality of elongated control rod assemblies horizontally through said control rod guide sleeves in a parallel relation to said fuel assemblies; the improvement comprising in combination, said control rod guide sleeves being of greater length than said fuel assemblies, a first core end plate provided with a plurality of vertical slots through which said elongated control rod guide sleeve is lowered, a second, opposing core end plate provided with a plurality of sockets to receive one end of each control rod guide sleeve, and a plurality of spacers insertable into said vertical slots on said first core end plate to individually hold each control rod guide sleeve in place.

4. The apparatus as defined in claim 3 wherein each of said vertical slots is of the same width as said control rod guide sleeves and is provided with vertical keyways in the sides thereof, and each of said spacers is provided with keys which are insertable into said keyway to hold said control rod guide sleeve in place.

5. In a nuclear reactor of the type having an elongated horizontally disposed pressure vessel with an access opening in an upper longitudinally extending side wall thereof, a core structure mounted within said vessel defined by an elongated base portion and a pair of parallel relatively spaced plate members extending transversely of said base portion, and having a plurality of elongated fuel assemblies and a plurality of elongated control rod guide sleeves, stacked in a horizontal position through said access opening and supported by said elongated base portion, said control rod guide sleeves having openings therethrough which coincide with openings in said plate members, and guide sleeve extension on either of the core structure holddown means for releasably securing said fuel assemblies and said control rod guide sleeves in a stacked condition lengthwise in the longitudinal direction of said pressure vessel, and means for reciprocating a plurality of control rod assemblies horizontally through said control rod guide sleeves and guide sleeve extensions; the improvement comprising in combination, said control rod guide sleeves being greater in length than the distance between said end plates, said end plates having sockets thereon to receive and align the ends of said control rod guide sleeves with said guide sleeve extensions, and spacers insertable into one of said end plates for locking said control rod guide sleeves in place.

6. In a nuclear reactor of the type having an elongated horizontally disposed pressure vessel with an access opening in an upper longitudinally extending side wall thereof, a core structure mounted within said vessel defined by an elongated base portion and a pair of parallel relatively spaced plate members extending transversely of said base portion and having a plurality of elongated fuel assemblies and a plurality of elongated control rod guide sleeves, stacked in a horizontal position through said access opening and supported by said elongated base portion, said control rod guide sleeves having openings therethrough which coincide with openings in said plate members and guide sleeve extensions on either side of the core structure, holddown means for releasably securing said fuel assemblies and said control rod guide sleeves in a stacked condition lengthwise in the longitudinal direction of said pressure vessel, and means for reciprocating a plurality of control rod assemblies horizontally through said control rod guide sleeves and guide sleeve extension; the improvement comprising in combination, said control rod guide sleeve being greater in length than the distance between said end plates, one of said end plates having vertical slots on the inside face thereof to facilitate loading of the elongated control rod guide sleeves, the other said end plate provided with a plurality of sockets on the inside face thereof to receive and align one end of said control rod guide sleeves with the adjacent guide sleeve extensions, and spacers insertable into the vertical slots on the one said end plate to hold the other end of said control rod guide sleeves in alignment with the other said guide sleeve extension.

7. The invention as described in claim 6 wherein said vertical slots are provided keyways on the inside edges thereof and the spacers are provided keys which mate therewith to firmly hold the spacer in position on the one end plate.

8. The invention as described in claim 7 wherein said spacers comprise a body portion which occupies the slot space between control rod guide sleeves which rests directly upon the control rod guide sleeve below and provides support for the control rod guide sleeve above, two leg portions which are insertable into said keyways and abut the opposing edges of the control rod guide sleeve and the guide sleeve extension to provide a smooth inner surface from the control rod guide sleeve to the guide sleeve extension.

References Cited

UNITED STATES PATENTS 3,208,914   9/1965   Dickson _____ 176—36

BENJAMIN R. PADGETT, *Primary Examiner.*

L. DEWAYNE RUTLEDGE, *Examiner.*

H. E. BEHREND, *Assistant Examiner.*